United States Patent
Yoshida

(10) Patent No.: US 9,787,926 B2
(45) Date of Patent: Oct. 10, 2017

(54) SOLID-STATE IMAGE APPARATUS AND IMAGE SYSTEM

(71) Applicant: CANON KABUSHIKI KAISHA, Tokyo (JP)

(72) Inventor: Daisuke Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 14/691,916

(22) Filed: Apr. 21, 2015

(65) Prior Publication Data

US 2015/0319380 A1 Nov. 5, 2015

(30) Foreign Application Priority Data

May 2, 2014 (JP) .................................. 2014-095503

(51) Int. Cl.
   *H04N 5/335* (2011.01)
   *H04N 5/378* (2011.01)
   *H04N 5/369* (2011.01)
   *H04N 5/243* (2006.01)

(52) U.S. Cl.
   CPC ............. *H04N 5/378* (2013.01); *H04N 5/243* (2013.01); *H04N 5/3355* (2013.01); *H04N 5/3696* (2013.01)

(58) Field of Classification Search
   CPC .. H04N 5/355; H04N 5/3745; H04N 5/37452; H04N 5/37455; H04N 5/37457
   USPC ........................................ 348/294, 300, 301
   See application file for complete search history.

(56) References Cited

U.S. PATENT DOCUMENTS

| | | | |
|---|---|---|---|
| 7,973,846 B2 * | 7/2011 | Reyneri | H04N 3/155 348/297 |
| 8,400,546 B2 | 3/2013 | Itano et al. | |
| 8,698,062 B2 | 4/2014 | Yoshida | |
| 2009/0086071 A1 * | 4/2009 | Kagawa | G01J 1/46 348/300 |
| 2009/0295970 A1 * | 12/2009 | Fukuoka | H04N 5/35527 348/308 |
| 2010/0309356 A1 * | 12/2010 | Ihara | H04N 5/3658 348/300 |
| 2012/0188427 A1 * | 7/2012 | Solhusvik | H04N 5/3559 348/300 |
| 2013/0206961 A1 | 8/2013 | Ikeda et al. | |
| 2013/0341489 A1 | 12/2013 | Yoshida | |

FOREIGN PATENT DOCUMENTS

JP 2009-177749 A 8/2009

\* cited by examiner

*Primary Examiner* — Anthony J Daniels
(74) *Attorney, Agent, or Firm* — Fitzpatrick, Cella, Harper & Scinto

(57) ABSTRACT

A solid-state image apparatus includes a pixel unit including a plurality of pixels arranged in a matrix, a plurality of amplifiers each provided to each of columns of the pixel unit, and each configured to amplify a signal output from a pixel in the corresponding one of the columns, a plurality of comparison units each provided to each of the plurality of amplifiers, and each configured to compare a level of an output signal from a corresponding one of the plurality of amplifiers with a predetermined threshold value and a control unit configured to control a gain of each of the plurality of amplifiers based on a result of comparing of a corresponding one of the plurality of comparison units.

18 Claims, 11 Drawing Sheets

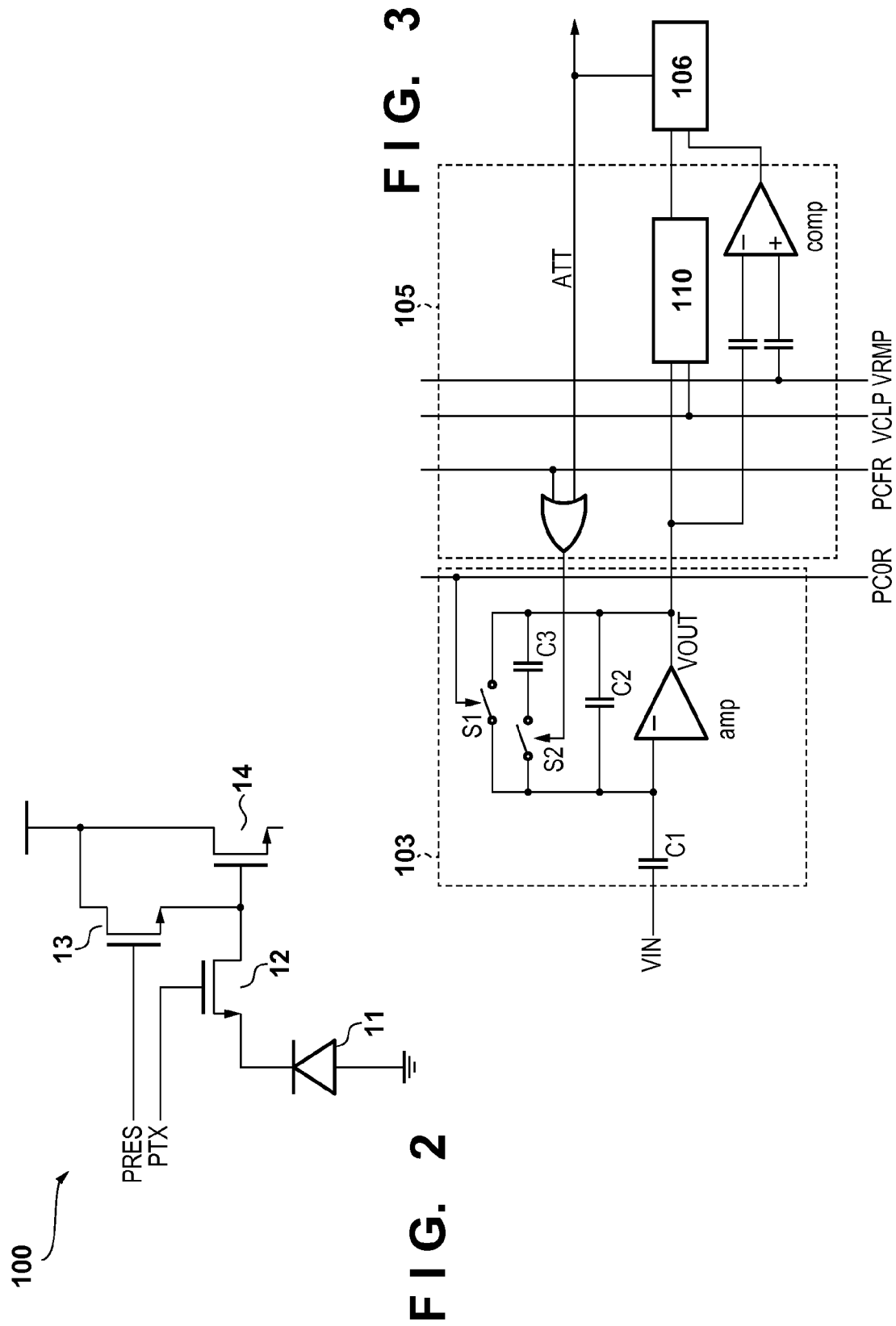

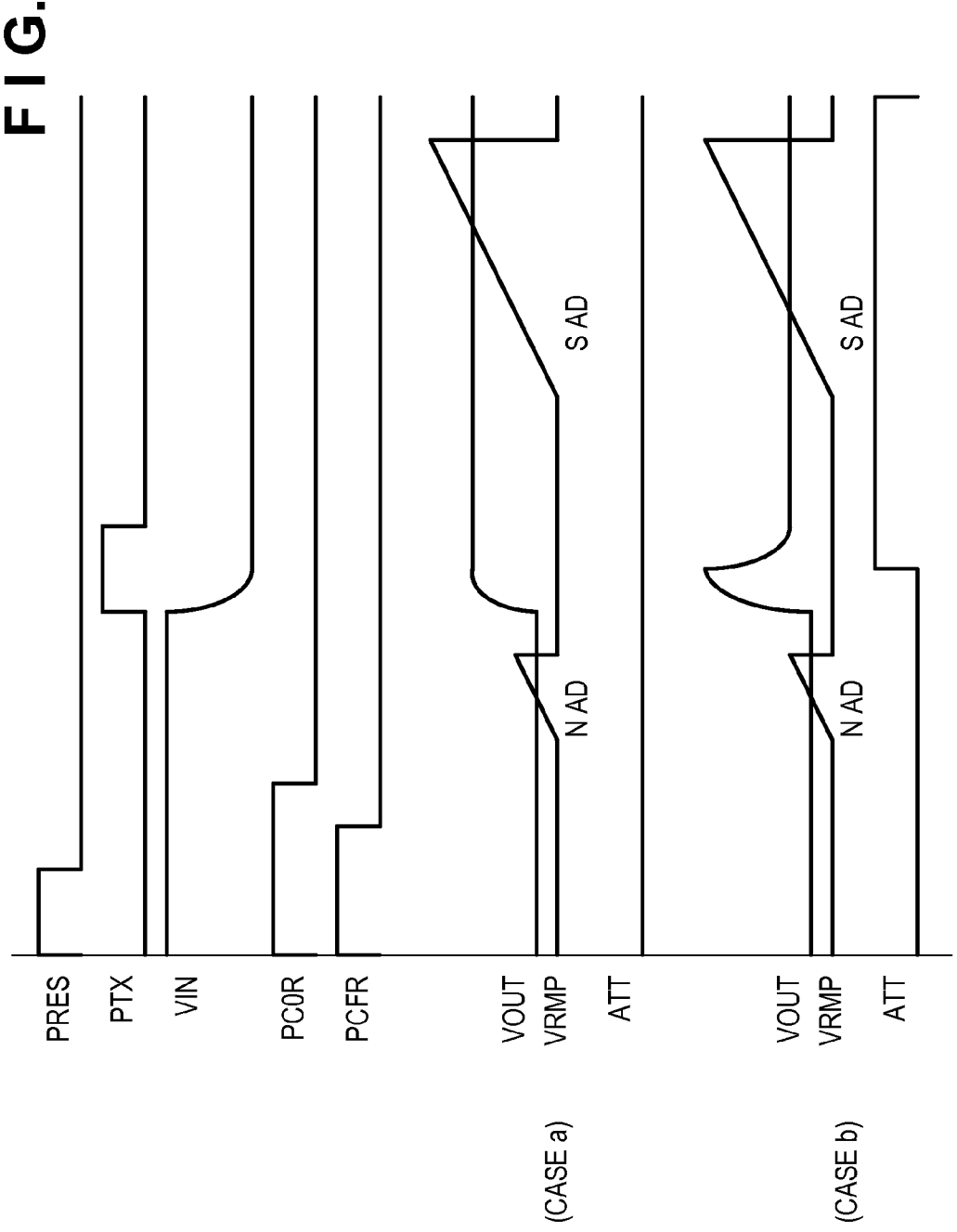

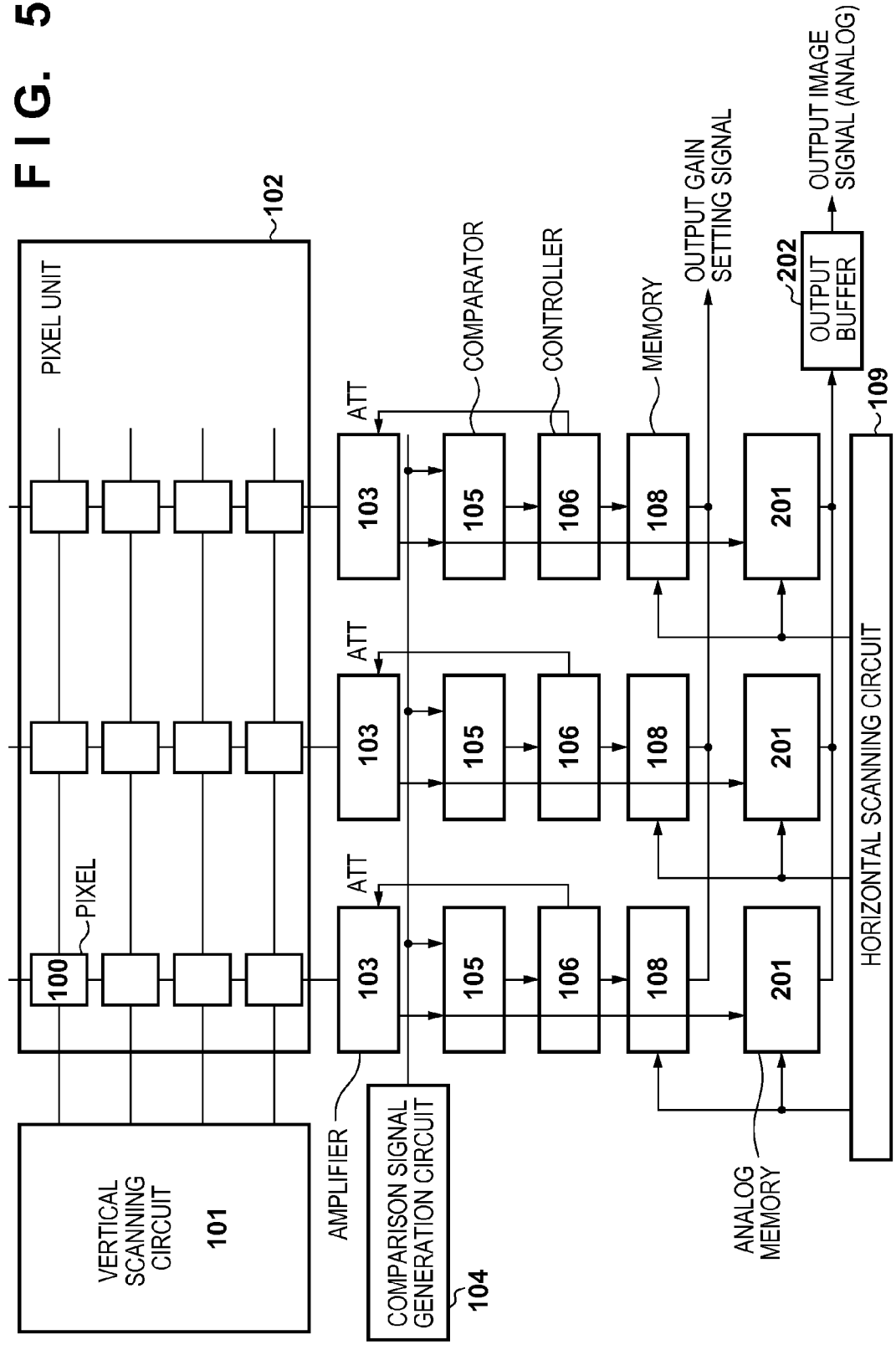

SOLID-STATE IMAGE APPARATUS AND IMAGE SYSTEM

BACKGROUND OF THE INVENTION

Field of the Invention

The present invention relates to solid-state image apparatuses and image systems having an amplifier circuit that amplifies a signal from a pixel.

Description of the Related Art

A solid-state image apparatus is known that has a pixel unit including a plurality of pixels arranged in a matrix, and amplifier circuits for amplifying a pixel signal, that are provided corresponding to respective columns. In this solid-state image apparatus, when an image of a subject having a high luminance is captured, the output voltage of a pixel signal is high. When, therefore, the output voltage of the amplifier circuit provided for the corresponding column is high, the power supply voltage or the ground potential is altered by a transient current flowing through the amplifier circuit. Therefore, in the captured image, horizontal band-like noise may occur in a portion corresponding to the high luminance portion. In order to reduce or prevent such noise, Japanese Patent Laid-Open No. 2009-177749 describes a circuit that is provided to restrict the output of the amplifier circuit.

SUMMARY OF THE INVENTION

According to an aspect of the present invention, the present invention provides a solid-state image apparatus comprising a pixel unit including a plurality of pixels arranged in a matrix, a plurality of amplifiers each provided to each of columns of the pixel unit, and each configured to amplify a signal output from a pixel in the corresponding one of the columns, a plurality of comparison units each provided to each of the plurality of amplifiers, and each configured to compare a level of an output signal from a corresponding one of the plurality of amplifiers with a predetermined threshold value and a control unit configured to control a gain of each of the plurality of amplifiers based on a result of comparing of a corresponding one of the plurality of comparison units, wherein the plurality of comparison units each include an output restriction unit configured to restrict the level of the output signal when the level of the output signal exceeds the predetermined threshold value, and the control unit outputs a signal indicating whether or not the output restriction unit has operated.

Further features of the present invention will become apparent from the following description of exemplary embodiments with reference to the attached drawings.

BRIEF DESCRIPTION OF THE DRAWINGS

FIG. 2 is a diagram showing an example circuit of a pixel.

FIG. 3 is a circuit diagram showing an example column circuit of an example solid-state image apparatus according to the first embodiment of the present invention.

FIG. 4 is a timing diagram for describing an operation of FIG. 3.

FIG. 5 is a circuit block diagram showing an example solid-state image apparatus according to the second embodiment of the present invention.

DESCRIPTION OF THE EMBODIMENTS

Figure 1:
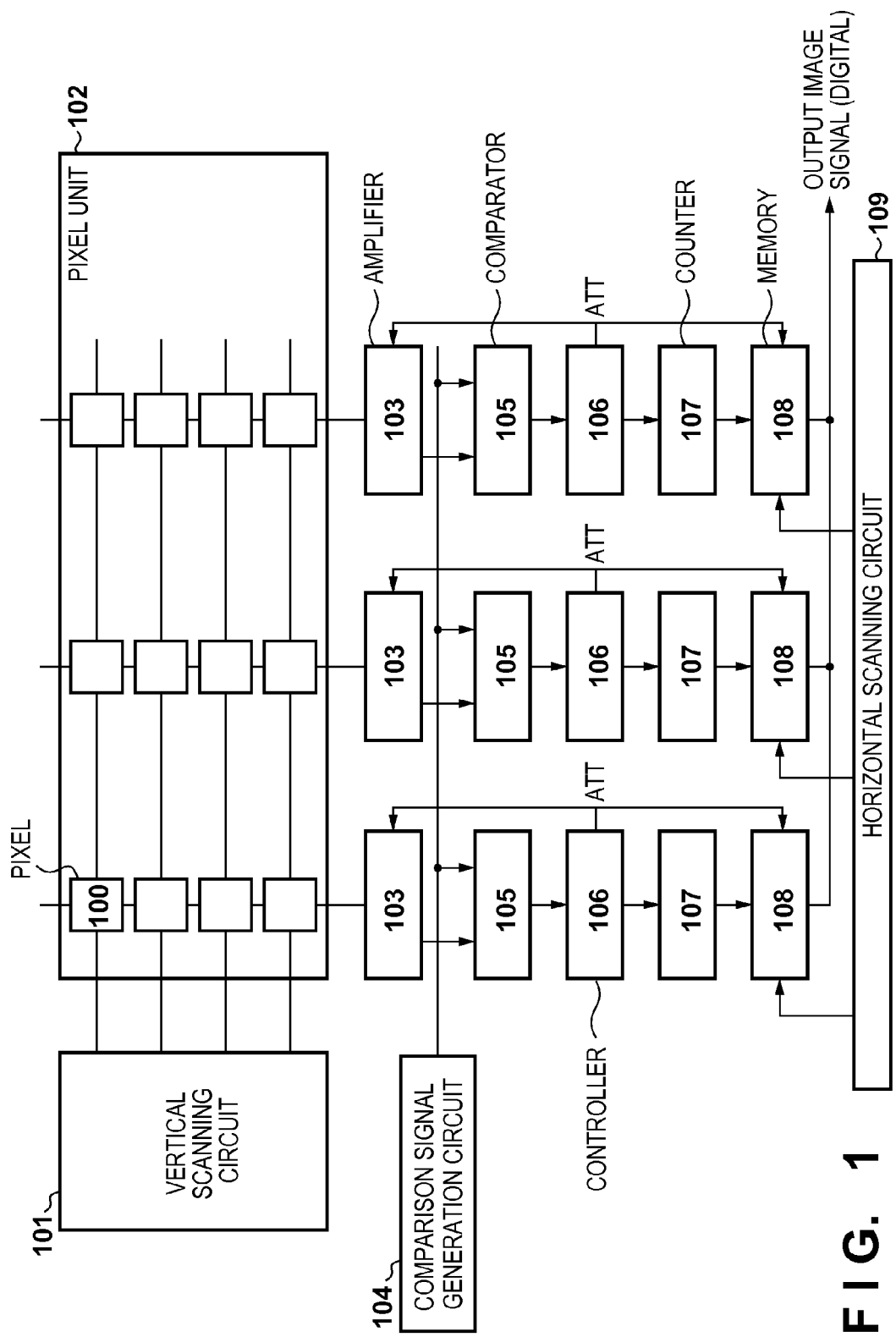
FIG. 1 is a circuit block diagram showing an example solid-state image apparatus according to the first embodiment of the present invention.

According to the present invention, an advantageous technique of reducing or avoiding saturation of an output of an amplifier can be provided.

First Embodiment

An example solid-state image apparatus that A/D converts an image signal using a counter type digital converter and then outputs the resultant image signal, will be described with reference to FIGS. 1-4. The solid-state image apparatus includes a pixel unit 102 that includes a plurality of pixels 100 arranged in a matrix. As shown in FIG. 2, the pixel 100 includes a photodiode 11, and a transfer transistor 12 that transfers photoelectric charge generated in the photodiode 11 to a gate electrode portion of an amplifier transistor 14. The pixel 100 also includes the amplifier transistor 14, and a reset transistor 13 that resets the gate electrode portion of the amplifier transistor 14.

The transfer transistor 12 is controlled according to a transfer signal (PTX signal) to transfer charge accumulated in the photodiode 11 to the amplifier transistor 14. Charge accumulated in the photodiode 11 or a floating diffusion (not shown) is reset according to a reset signal (PRES signal). A vertical scanning circuit 101 performs a control to read image signals from the pixels 100 arranged in the pixel unit 102, by row (i.e., on a row by row basis). The image signals read from the pixels 100 are input to amplifiers 103 arranged by column (for respective columns, i.e., one amplifier 103 is provided for each column), through column output lines arranged by column (for respective columns, i.e., one column output line is provided for each column).

A signal that has been amplified by the amplifier 103 by a predetermined gain, is input to a comparison unit 105. The comparison unit 105 performs comparison for detection of an excessive signal and comparison for A/D conversion, on the signal amplified by the amplifier 103. In order to detect an excessive signal, the comparison unit 105 compares the input signal with a comparison voltage (VCLP voltage) generated by a comparison signal generation circuit 104, and outputs the determination result to a control unit 106. The control unit 106 generates a determination result signal (ATT signal) based on the comparison result from the comparison unit 105, and outputs the determination result signal to the amplifier 103 to change the gain of the amplifier 103. The control unit 106 also outputs the ATT signal to a memory 108 that stores an A/D converted image signal. The memory 108 stores the ATT signal.

The comparison unit 105 also compares the signal amplified by the amplifier 103 with a ramp signal (VRMP signal) whose voltage changes with time at a predetermined rate. The comparison unit 105 outputs a signal indicating the comparison result to the control unit 106 when the relative order of magnitude of the signal amplified by the amplifier 103 and the VRMP signal is reversed. The control unit 106 controls an operation of a counter 107 based on the comparison result signal from the comparison unit 105, to perform A/D conversion. The A/D converted image signal is accumulated in the memory 108 together with the ATT signal from the control unit 106. Data containing the image signals (digital data) and ATT signals accumulated in the memory is successively read out by a horizontal scanning circuit 109. A gain correction process is performed on the image signal read from the memory 108 by the horizontal scanning circuit, based on the ATT signal.

FIG. 3 shows an example circuit of the amplifier 103, the comparison unit 105, and the control unit 106 according to this embodiment. The amplifier 103 includes an inverting amplifier amp, and a switched capacitor circuit including an input capacitance C1, feedback capacitances C2 and C3, and switches. In this embodiment, the input capacitance C1 and the feedback capacitance C2 are assumed to have the same capacitance of C, and the feedback capacitance C3 is assumed to have a capacitance of 3C, which is three times as high as that of the input capacitance C1.

The comparison unit 105 includes a comparator circuit comp that compares an output signal (VOUT signal) of the inverting amplifier amp with the VRMP signal, and an output restriction circuit 110. The output restriction circuit 110 includes a circuit that clips an output voltage so that the VOUT signal of the inverting amplifier amp does not become excessive. The output restriction circuit 110 also outputs the determination result indicating whether or not the VOUT signal is higher than the VCLP voltage, to the control unit 106, in order to control the gain of the inverting amplifier amp. The VCLP voltage is a reference voltage for determining a threshold voltage based on which the output restriction circuit 110 restricts the VOUT signal. The control unit 106 switches a signal level of the ATT signal between the high level and the low level based on the determination result of the output restriction circuit 110.

FIG. 4 is a timing diagram for describing an operation of FIG. 3. Note that, here, a case where a low luminance signal is input (case "a") and a case where a high luminance signal is input (case "b") are shown in the same figure for comparison. Initially, by causing the PRES signal to go high, the reset transistor 13 is turned on, and therefore, the pixel 100 is reset. At this time, by causing a PC0R signal and a PCFR signal to go high, the switches S1 and S2 are turned on. When the PRES signal is caused to go high, then if the PTX signal is caused to go high, charge that has been accumulated in the photodiode 11 until that time can be discharged to a power supply (reset operation).

When the switches S1 and S2 are turned on, the input and output terminals of the inverting amplifier amp are short-circuited, so that the input capacitance C1 and the two feedback capacitances C2 and C3 are simultaneously reset, and an initial clamp operation is performed. Thereafter, the PCFR signal, the PC0R signal, and the PRES signal are caused to go low, so that the switches S1 and S2 are turned off. As a result, the feedback capacitance C2 is connected to a feedback path of the amplifier 103, and the capacitance C3 is disconnected, and therefore, the closed-loop gain of the amplifier 103 is set to one. Next, a signal having a reference level that is a level after the pixel 100 is reset, is A/D converted.

The signal having the reference level is amplified by the amplifier 103. During A/D conversion, the comparison signal generation circuit 104 monotonically changes the voltage of the VRMP signal with time. The VRMP signal is compared with the amplified VOUT signal having the reference level from the amplifier 103. By measuring the time it takes for the relative order of magnitude of the VRMP signal and the VOUT signal to be reversed, the A/D conversion of the signal having the reference level is performed (indicated by "N AD" in the figures). The result of the A/D conversion of the signal having the reference level is stored in the memory 108. The operation so far described is common to the case "a" and the case "b."

Next, an image signal is A/D converted. By causing the PTX signal to go high, an image signal corresponding to the amount of light is read from the photodiode 11. The image signal is amplified by the amplifier 103, and the resultant image signal is output as the VOUT signal. The VOUT signal is input to the output restriction circuit 110.

The output restriction circuit 110 determines the magnitude of the VOUT signal, and if the VOUT signal is higher than a predetermined voltage determined by the VCLP voltage, performs a clip operation. The output restriction circuit 110 also outputs a signal indicating whether or not the clip operation has been performed, to the control unit 106. If the VOUT signal is lower than the predetermined voltage, the output restriction circuit 110 does not perform the clip operation. In this case, as shown in the case "a" of FIG. 4, the PTX signal is caused to go high, so that the image signal is input to the amplifier 103. At this time, the ATT signal generated by the control unit 106 is low, and the switch S2 is off, and the image signal is A/D converted according to the VRMP signal from the comparison signal generation circuit 104 (indicated by "S AD" in the figures).

On the other hand, as shown in case "b" of FIG. 4, when the PTX signal is caused to go high, then if a signal from a pixel is excessive, the amplifier 103 outputs the VOUT signal that is higher than the predetermined voltage and has a sharp rising edge, to the output restriction circuit 110. At this time, if the output restriction circuit 110 detects that the signal is higher than the predetermined voltage, the output restriction circuit 110 outputs the determination result to the control unit 106. When receiving this determination result, the control unit 106 causes the ATT signal to go high. As a result, the switch S2 is turned on, the feedback capacitance 3C of the amplifier 103 is connected to the amplifier 103, and the closed-loop gain of the amplifier 103 is changed to ¼. As a result, the signal level of the VOUT signal from the amplifier 103 is reduced as shown in FIG. 4. After this time, during the time when A/D conversion is performed, the ATT signal is high, and therefore, the gain of the amplifier 103 is set to ¼. As a result, A/D conversion is performed on an image signal that has been reduced by a factor of 4.

The A/D converted image signal is stored in the memory 108. The solid-state image apparatus performs digital correlated double sampling (CDS) to subtract the A/D conversion result "N AD" of the reference level from the A/D conversion result "S AD" of the image signal, thereby improving the S/N ratio of the signal. When the image signal is stored, the ATT signal generated by the control unit 106 is output together with the image signal, and is added to data of the A/D converted image signal related thereto, and is stored in the memory 108. If the ATT signal is stored in the memory 108 in association with data of the image signal, it can be determined whether the image signal has been A/D converted by a gain of ¼ or 1. Therefore, when data is output from the memory 108, then if the data is processed using the ATT signal, an image signal can be obtained by correcting the A/D converted data.

Thus, the setting of the gain of the amplifier 103 can be changed by column (i.e., on a column by column basis) based on the level of the luminance of an image signal, resulting in a wider dynamic range and a higher S/N. Also, by changing the setting of the gain of the amplifier 103, the saturation of the amplifier 103 can be reduced or prevented. Although the counter type A/D converter has been described as an example, other types of A/D converters may be employed.

Second Embodiment

A second embodiment will be described with reference to FIG. 5. While, in the first embodiment, an image signal is converted into a digital signal by A/D conversion and is then output, an image signal is output while it is still an analog signal in this embodiment. An image signal read from the pixel 100 is amplified by the amplifier 103. The amplified image signal is accumulated in a corresponding one of analog memories 201 provided by column (for respective columns, i.e., one analog memory 201 is provided for each column). The comparison unit 105 compares the amplified image signal with the VCLP voltage generated by the comparison signal generation circuit 104, to output the ATT signal. The ATT signal is input to the amplifier 103, and is used to adjust the gain of the amplifier 103 as in the first embodiment. The amplifier 103 has a configuration similar to that of the first embodiment. When the level of an image signal from a pixel is excessive, the gain of the amplifier 103 is reduced. The ATT signal is accumulated as information indicating the gain of the amplifier 103 in the memory 108 together with an image signal related thereto.

The horizontal scanning circuit 109 successively reads the ATT signals and the image signals from the memories 108 and the analog memories 201. The image signal read from the analog memory 201 is read out through an output buffer 202. The amplitude of the image signal is adjusted based on the ATT signal read from the memory 108. Even when the analog memory 201 is used, the reference level and the image signal level can each be stored in the analog memory. Also, by changing the setting of the gain of the amplifier 103, the saturation of the amplifier 103 can be reduced or prevented, resulting in a wider dynamic range and a higher S/N.

Third Embodiment

Figure 6:
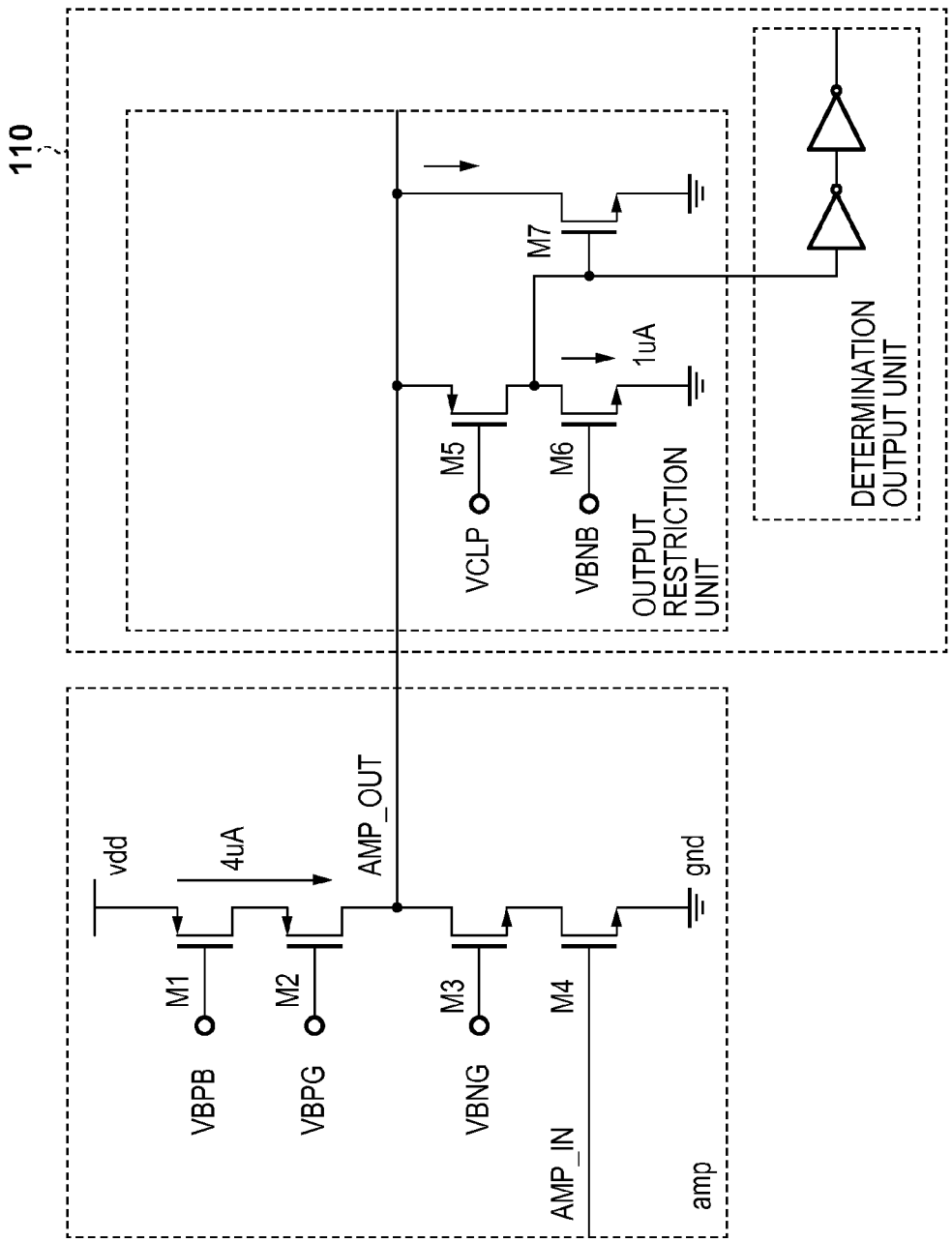
FIG. 6 is a circuit diagram showing an example column circuit of an example solid-state image apparatus according to the third embodiment of the present invention.

An example circuit for achieving the inverting amplifier amp and the output restriction circuit 110 will be described with reference to FIG. 6. The inverting amplifier amp includes, as main elements, a source-grounded amplifier circuit including an NMOS transistor M4. The inverting amplifier amp also includes a gate-grounded NMOS transistor M3, and PMOS transistors M1 and M2 that are connected together in a cascode configuration and operate as a constant current load. A VBPB voltage, a VBPG voltage, and a VBNG voltage that are input to the gates of the respective transistors are a DC bias voltage that determines the operating point of the corresponding transistor. The output restriction circuit 110 includes an output restriction unit and a determination output unit.

The threshold value of the output restriction unit with which the output is restricted is determined based on the VCLP voltage input to the gate of a PMOS transistor M5. An NMOS transistor M6 is used to sink a constant current when the PMOS transistor M5 is turned on. A VBNB voltage is a DC bias voltage that determines the operating point of the NMOS transistor M6. An input signal is input to an input terminal AMP_IN. An output is output as a VOUT signal from an output terminal AMP_OUT of the inverting amplifier amp.

When the output level of the output terminal AMP_OUT of the inverting amplifier amp is low, the PMOS transistor M5 is off. Because the NMOS M6 is on, the gate voltage of an NMOS transistor M7 is substantially at the ground level, and therefore, the NMOS transistor M7 is off. Because both the PMOS transistor M5 and the NMOS transistor M7 are off, the output restriction unit has substantially no influence on the VOUT signal of the inverting amplifier amp.

When a high luminance signal is input to the inverting amplifier amp, the potential of the output terminal AMP_OUT of the inverting amplifier amp increases. When the potential of the output terminal AMP_OUT of the inverting amplifier amp exceeds the threshold value determined by the VCLP voltage, the PMOS transistor M5 is turned on. At the same time, the gate voltage of the NMOS transistor M7 also increases, so that both the PMOS transistor M5 and the NMOS transistor M7 are turned on. As a result, currents flowing from the PMOS transistors M1 and M2, which are a load current source for the inverting amplifier amp, partially flow into both the PMOS transistor M5 and the NMOS transistor M7 of the output restriction unit, and therefore, the output level of the output terminal AMP_OUT of the inverting amplifier amp can be restricted.

The output restriction circuit 110 additionally includes a determination output unit. The determination output unit is a circuit for detecting that an image signal is excessive, using an output signal from the output restriction unit. The determination output unit, which includes an inverter, detects that the output restriction is active, by detecting that the gate voltage of the NMOS transistor M7 has increased, and outputs the result of determination of the level of the image signal to the control unit 106. The control unit 106, when receiving the determination result indicating that the image signal is excessive, outputs the ATT signal. The control unit 106 also sends the ATT signal to the memory 108. The memory 108 that has received the ATT signal stores information indicating that the gain of the amplifier 103 has been controlled, in association with data of the A/D converted image signal.

Fourth Embodiment

Figure 7:
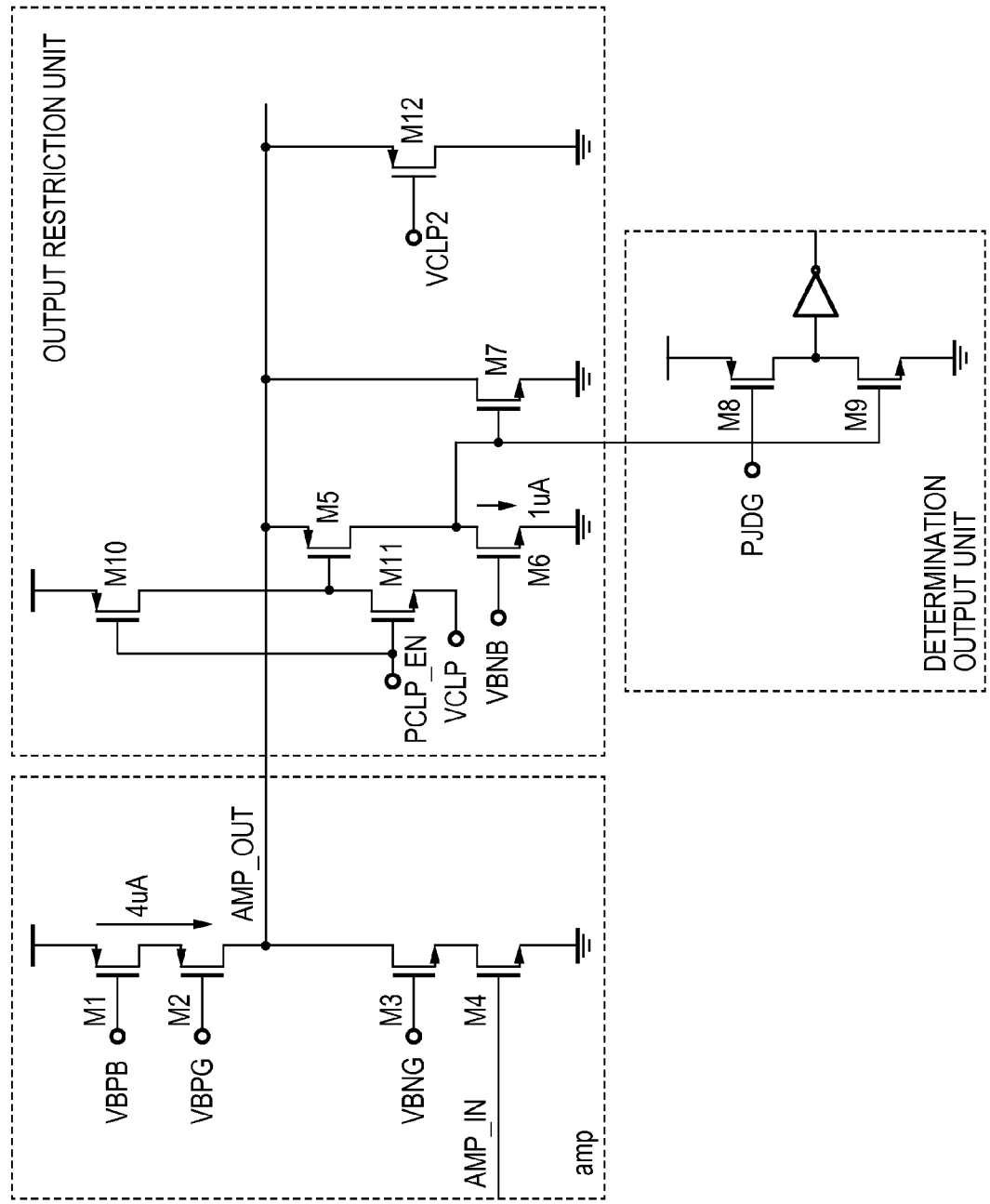
FIG. 7 is a circuit diagram showing an example column circuit of an example solid-state image apparatus according to the fourth embodiment of the present invention.

An example in which two threshold values for restricting an output can be set and an inverter in the first stage of a determination output unit can be controlled, will be described with reference to FIGS. 7 and 8. An NMOS transistor M9 is a source-grounded NMOS transistor included in the inverter in the first stage of the determination output unit. A PMOS transistor M8 is for determining determination output timing. While the NMOS transistor M7 provides a current path for first output restriction, a PMOS transistor M12 provides a current path for second output restriction. A threshold value for the output restriction of the PMOS transistor M12 is determined based on a second comparison voltage (VCLP2 voltage).

In this embodiment, it is assumed that the VCLP2 voltage>the VCLP voltage. An NMOS transistor M11 serves as a switch for enabling the clip operation of the NMOS transistor M7. A PMOS transistor M10 serves as a switch for connecting the gate voltage of the PMOS transistor M5 to a power supply voltage (vdd) and thereby disabling the clip operation of the PMOS transistor M5.

Figure 8:
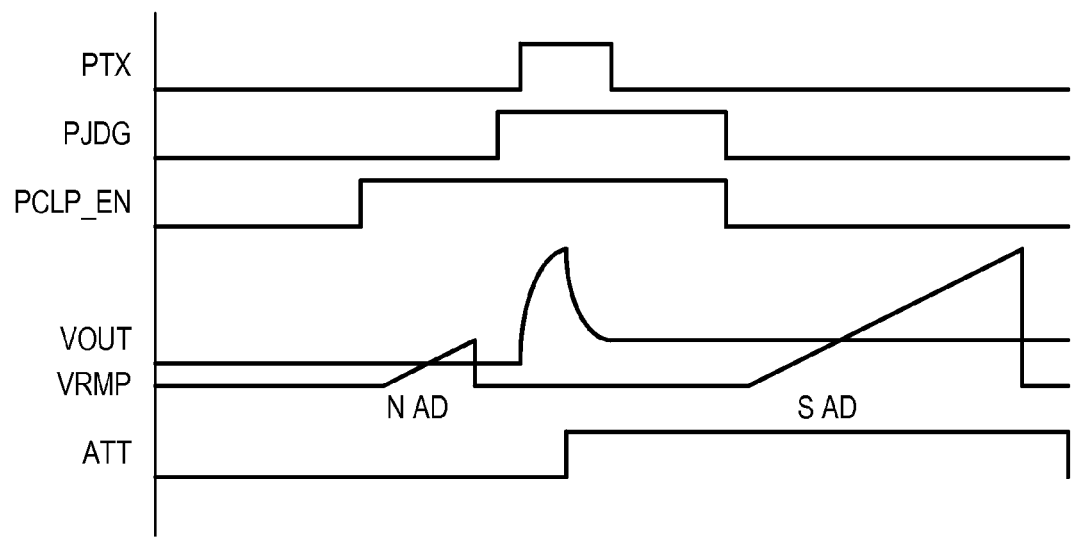
FIG. 8 is a timing diagram for describing an operation of FIG. 7.
Figure 9:
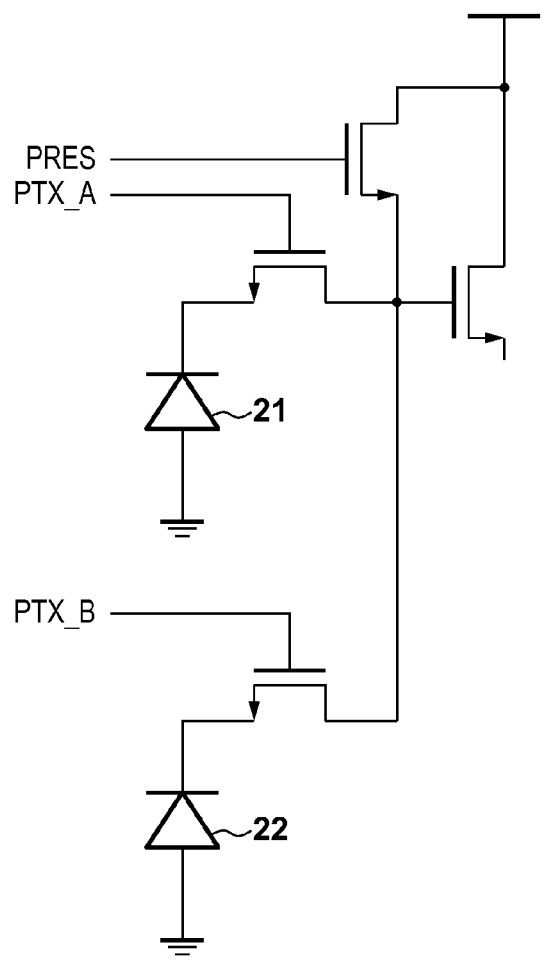
FIG. 9 is a diagram showing an example circuit of a pixel including a plurality of photoelectric converters.
Figure 10:
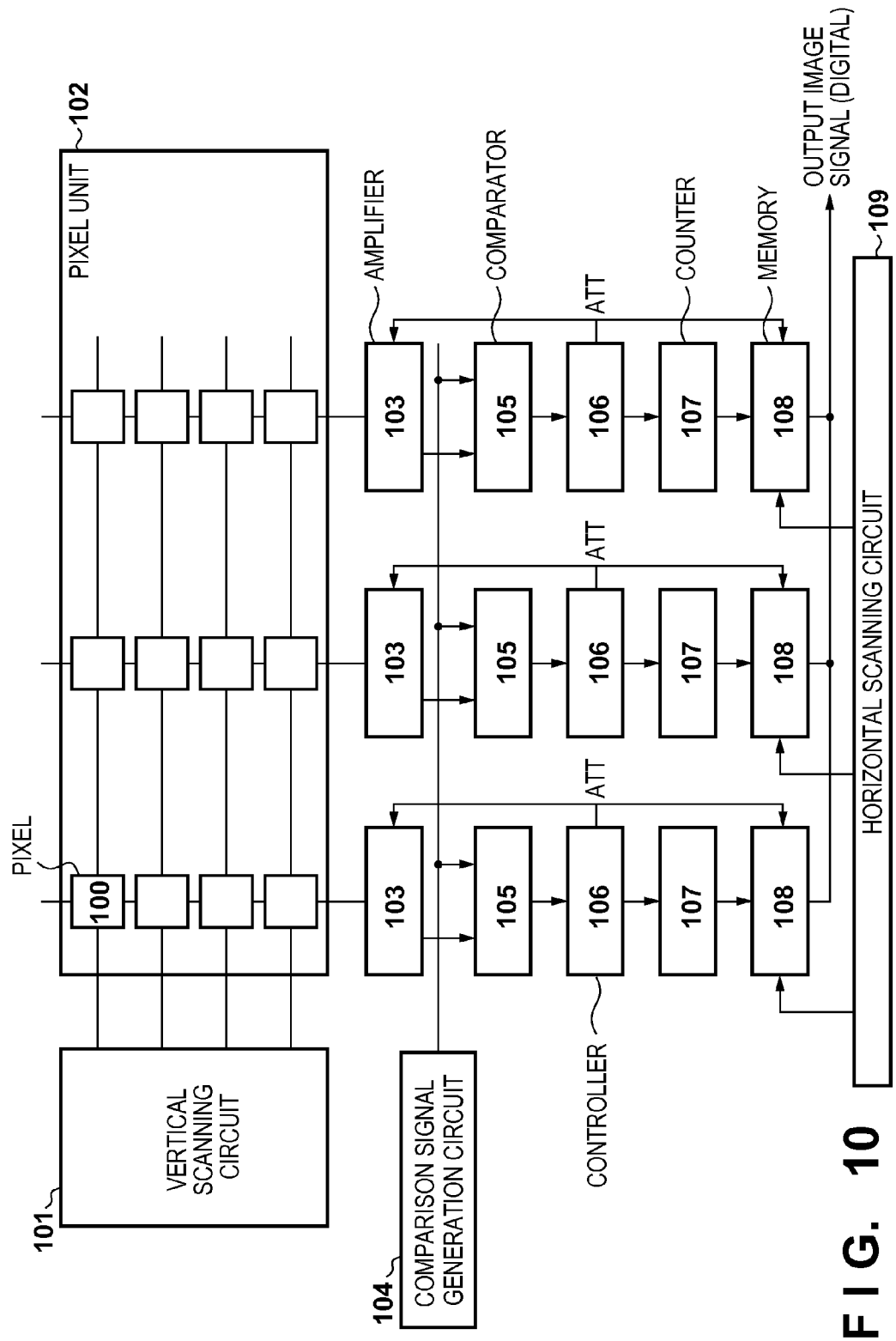
FIG. 10 is a circuit block diagram showing an example solid-state image apparatus according to the fifth embodiment of the present invention.
Figure 11:
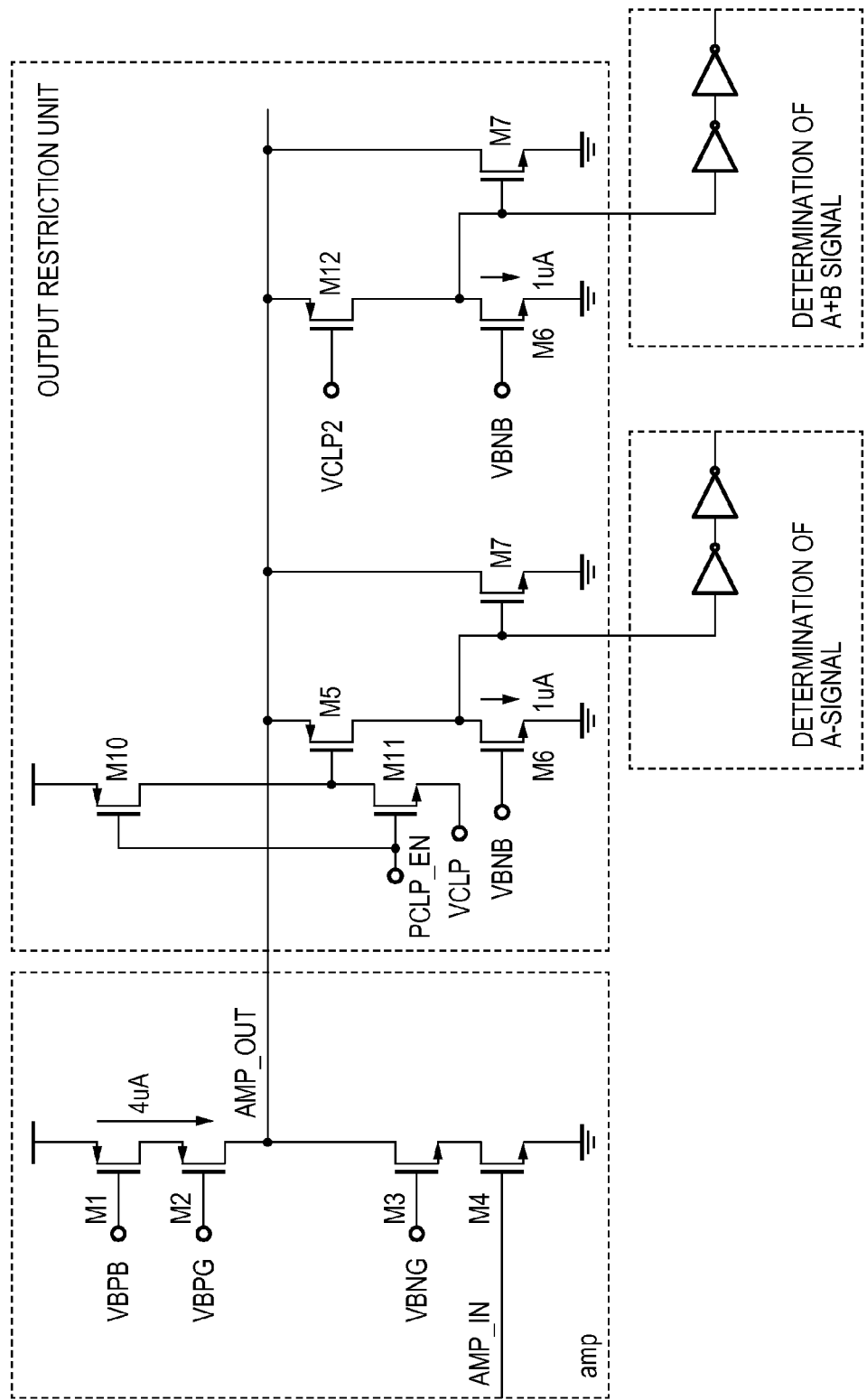
FIG. 11 is a circuit diagram showing an example column circuit of an example solid-state image apparatus according to the fifth embodiment of the present invention.
Figure 12:
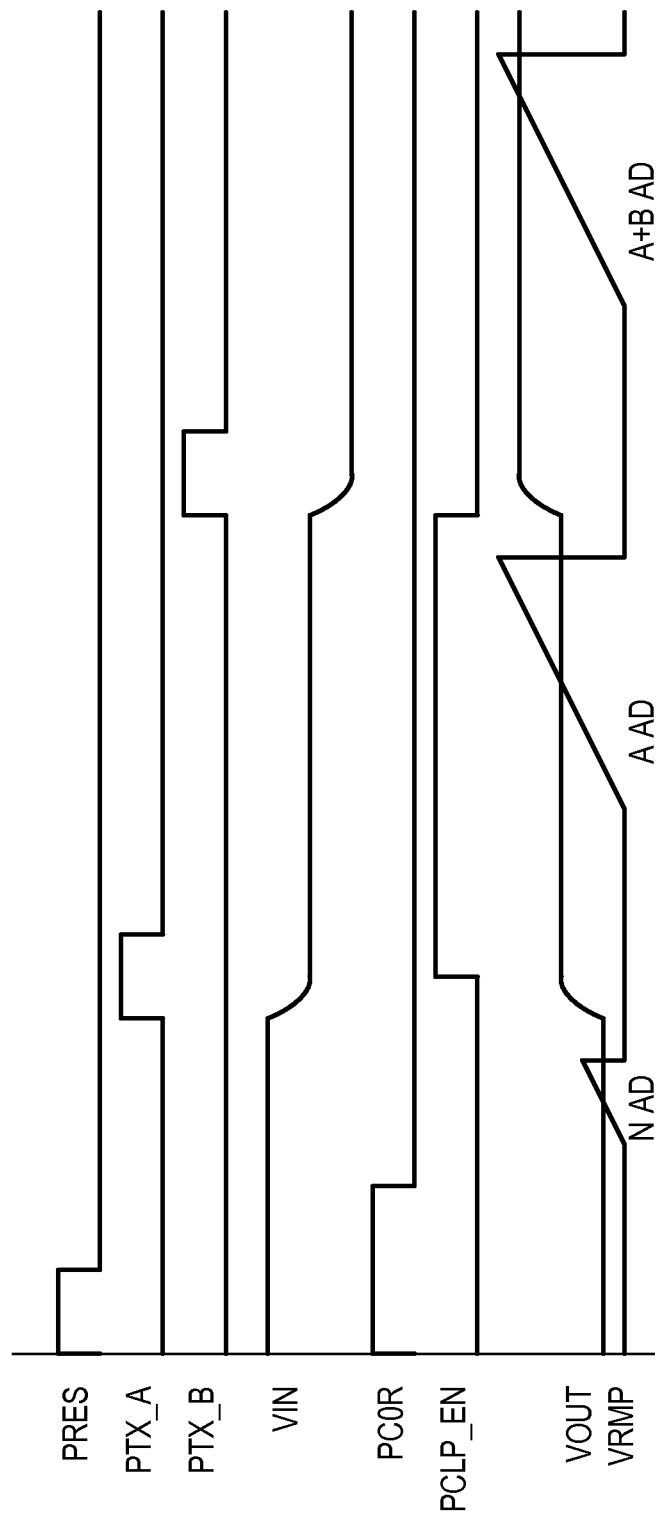
FIG. 12 is a timing diagram for describing an operation of an example solid-state image apparatus according to the fifth embodiment of the present invention.

The following description is given with reference to a timing diagram shown in FIG. 8. A PCLP_EN signal is controlled to go high so that the PMOS transistor M5 of the output restriction unit is enabled. An NMOS transistor M11 is turned on, so that the gate voltage of M5 is the VCLP voltage. At this time, both the PMOS transistor M5 and the PMOS transistor M12 are enabled. Because there is a relationship, the VCLP2 voltage>the VCLP voltage, the PMOS transistor M5 can be earlier enabled. Next, by causing a PJDG signal to go high before causing the PTX signal to go high, the output of an inverter including the PMOS transistor M8 and the NMOS transistor M9 is caused to have high impedance, and therefore, is maintained high level due to parasitic capacitance.

When the PTX signal is high, then if a high luminance signal is input from a pixel, the PMOS transistor M5 is first turned on, so that the gate voltages of the NMOS transistors M7 and M9 increase. As a result, the output of the inverter including the PMOS transistor M8 and the NMOS transistor M9 is inverted into the low level.

Based on the output of the inverter, the control unit 106 (not shown in FIG. 7) inverts the ATT signal into the high level, and outputs the resultant ATT signal. As a result, the gain of the amplifier 103 is set to be low. Thereafter, by causing the PCLP_EN signal and the PJDG signal to go low before the start of A/D conversion of the image signal ("S AD" in the figures), the PMOS transistor M5 and the determination output unit are caused to be inactive, and only the PMOS transistor M12 is enabled. Here, the reason why the PMOS transistor M5 and the determination output unit are caused to be inactive, is as follows. When the input signal is slightly lower than the threshold voltage of the PMOS transistor M5, the PMOS transistor M5 performs a sub-threshold operation. When the PMOS transistor M5 performs the sub-threshold operation, the PMOS transistor M5 is not completely off, leading to an error in the output signal (VOUT signal) of the inverting amplifier amp. Therefore, the PMOS transistor M5 and the determination output unit are caused to be inactive.

After the PCLP_EN signal and the PJDG signal are caused to go low, the A/D conversion ("S AD") of an image signal is started. During the A/D conversion of the image signal, the ATT signal is output, and the gain of the amplifier 103 is controlled to be low. Thereafter, when a voltage exceeding the VCLP2 voltage occurs at the output of the inverting amplifier amp, the PMOS M12 is turned on, so that a current flows therethrough, and therefore, the output can be restricted.

Fifth Embodiment

Next, an example in which each pixel includes at least two photoelectric converters will be described with reference to FIGS. 9-12. The configuration already described will not be described. In this embodiment, each pixel includes at least two photoelectric converters, and outputs at least two signals. The at least two signals are used to perform phase difference detection type focus detection, for example. An example pixel that outputs a signal that can be used in such a focus detection technique will be shown in FIG. 9. A pair of photoelectric converters are arranged below each single microlens included in a two-dimensional microlens array. In an image apparatus including such pixels, focus detection can be performed and an image signal can be obtained, based on a signal provided from one of the photoelectric converters arranged in the pixel (hereinafter referred to as an "A-signal") and a signal provided from the other photoelectric converter (hereinafter referred to as a "B-signal"). Specifically, the A-signal, and a signal obtained by adding the A-signal and a signal of the other photoelectric converter(s) (hereinafter referred to as an "A+B signal"), may be successively read out and used as a signal for focus detection and an image signal.

Here, an example in which an image signal is A/D converted before being output will be described. By causing two transfer pulses PTX A and PTX B to successively go high, an A-signal and an A+B signal are successively read from the photoelectric converters 21 and 22 of a pixel. The A/D conversion of the A-signal (indicated by "A AD" in FIG. 12) and the A/D conversion of the A+B signal (indicated by "A+B AD" in FIG. 12) are performed successively. Here, by causing the PCLP_EN signal to go high only during the period "A AD" during that the A-signal is A/D converted, the output of the A-signal is restricted using a threshold value that is determined based on the VCLP voltage. During the period "A+B AD," the PCLP_EN signal is caused to go low, and the output is restricted using a threshold value that is determined based on the VCLP2 voltage.

Thus, the outputs of the A-signal and the A+B signal can be restricted using the different threshold values. Because the determination can be performed using different signal levels, a signal level that is an upper limit of phase difference detection may be set for the determination of the A-signal, and the gain of the amplifier 103 may be reduced to cause the signal level of the A+B signal to have an appropriate level during the determination of the signal level of the A+B signal, for example. As a result, the saturation of the amplifier 103 can be reduced or avoided.

In the above examples, an example has been described in which when the output of an amplifier exceeds the threshold value, a restriction circuit operates. However, for example, if the polarity of signal charge is opposite, or if the amplifier 103 is a non-inverting amplifier, a restriction circuit may operate when the output of the amplifier is lower than the threshold value. All of these cases are collectively referred to as "the output of the amplifier exceeds the threshold value."

Sixth Embodiment

Figure 13:
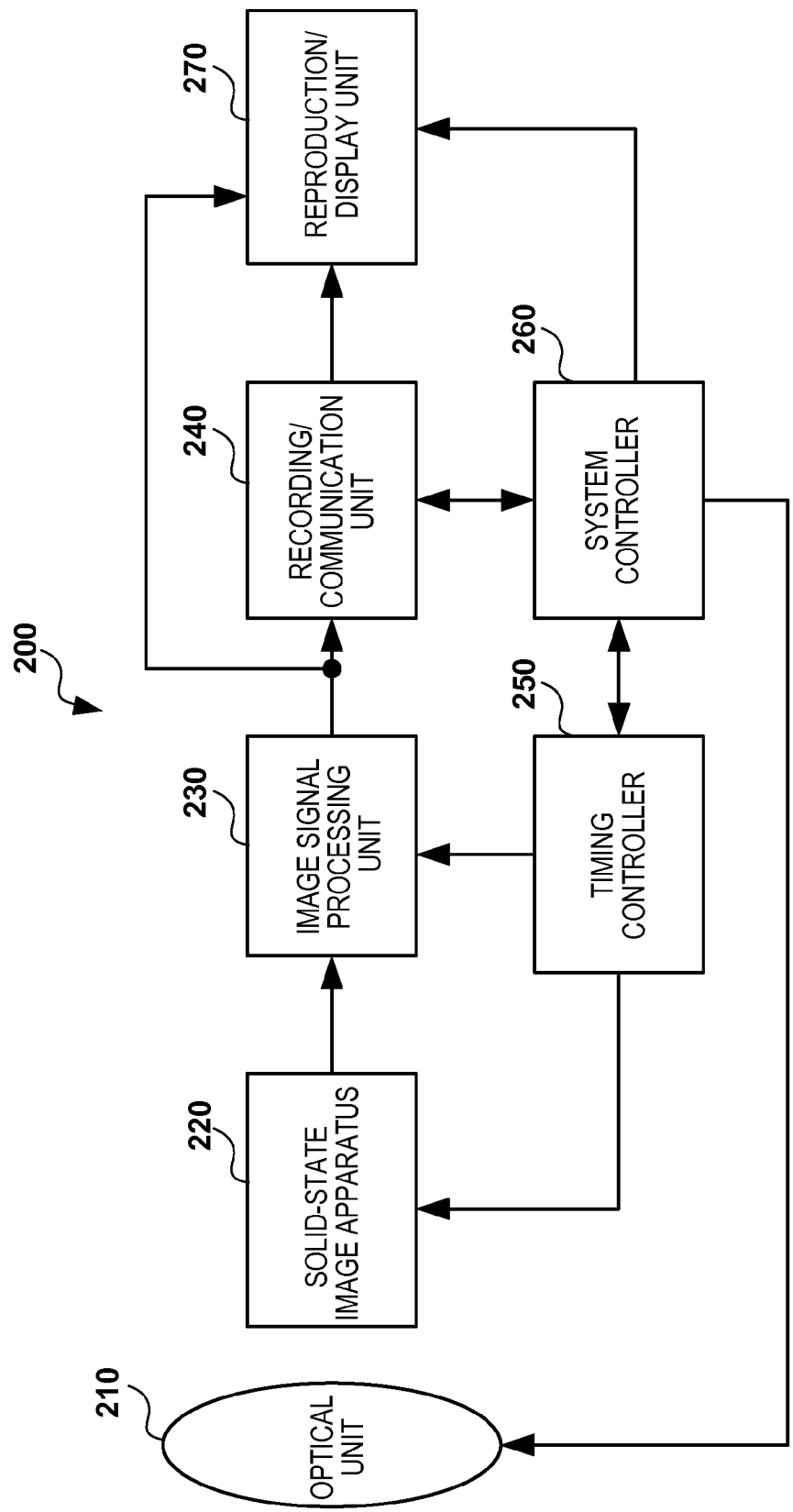
FIG. 13 is a diagram showing an example image system according to the sixth embodiment of the present invention.

FIG. 13 is a diagram showing an example configuration of an image system according to a sixth embodiment of the present invention. The image system 200 includes, for example, an optical unit 210, a solid-state image apparatus 220, an image signal processing unit 230, a recording/communication unit 240, a timing controller 250, a system controller 260, and a reproduction/display unit 270. The solid-state image apparatus 220 is one that has been described in the above example.

The optical unit 210, which is an optical system, such as a lens or the like, brings light from a subject into a focus on the pixel unit 102 of the solid-state image apparatus 220 in which a plurality of pixels are arranged in a two-dimensional array, to form an image of the subject. The solid-state image apparatus 220 outputs a signal corresponding to the light imaged on the pixel unit 102 with timing that is based on a signal from the timing controller 250. A signal output from the solid-state image apparatus 220 is input to the image signal processing unit 230, which then performs signal processing using a technique according to a program or the like. The image signal processing unit 230 may perform focus detection based on the A-signal and the A+B signal described in the above examples. A signal obtained by the process in the image signal processing unit 230 is sent as image data to the recording/communication unit 240. The recording/communication unit 240 sends a signal for forming an image to the reproduction/display unit 270, which then reproduces and displays a moving image or a still image. The recording/communication unit 240 also receives a signal from the image signal processing unit 230, and communicates with the system controller 260, and in addition, records a signal for forming an image to a recording medium (not shown).

The system controller 260, which comprehensively controls the operation of the image system, controls drive of the optical unit 210, the timing controller 250, the recording/communication unit 240, and the reproduction/display unit 270. The system controller 260 also includes a storage device (not shown), such as a recording medium or the like, which stores a program required to control the operation of the image system. The system controller 260 also supplies, for example, a signal for controlling the image system according to a user's operation, to the image system. Specific examples of the control provided by the system controller 260 include changing rows to be read out or reset, changing an angle of view for electrical zooming, shifting an angle of view for image stabilization, and the like. The timing controller 250 controls drive timing of the solid-state image apparatus 220 and the image signal processing unit 230 under the control of the system controller 260.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095503, filed May 2, 2014, which is hereby incorporated by reference herein in its entirety.

What is claimed is:

1. A solid-state image apparatus comprising:
   a pixel unit including a plurality of pixels arranged in a matrix;
   a plurality of amplifiers configured to amplify signals output from the pixels;
   a plurality of output restriction circuits, each provided for a corresponding one of the plurality of amplifiers and configured to perform comparing of a level of an output signal from the corresponding one of the plurality of amplifiers with a predetermined value and output a result of the comparing; and
   a plurality of memories, each provided for a corresponding one of the plurality of output restriction circuits,
   wherein each of the plurality of output restriction circuits restricts the level of the output signal when the level of the output signal exceeds the predetermined value,
   wherein each of the plurality of output restriction circuits outputs the corresponding result of the comparing to both a corresponding one of the plurality of memories and a corresponding one of the plurality of amplifiers, and
   wherein a gain of each of the plurality of amplifiers is changed based on the result of the comparing.

2. The solid-state image apparatus according to claim 1, wherein each of the plurality of output restriction circuits further compares the level of an output signal with a second predetermined value which is different from the predetermined value.

3. The solid-state image apparatus according to claim 1, further comprising an A/D converter configured to A/D convert the output signal from at least one of the plurality of amplifiers.

4. The solid-state image apparatus according to claim 3, wherein a corresponding one of the plurality of memories is configured to store the A/D converted signal and the result of the comparing by the corresponding one of the plurality of output restriction circuits.

5. The solid state image apparatus according to claim further comprising a controller,
   wherein the controller receives the result of comparing by at least one of the plurality of output restriction circuits, and outputs a determination result signal for controlling a gain of a corresponding one of the amplifiers to the amplifier during the A/D conversion.

6. The solid-state image apparatus according to claim 5, wherein the controller decreases the gain of the corresponding amplifier when the level of the output signal from the corresponding amplifier exceeds the predetermined value.

7. The solid-state image apparatus according to claim 1, wherein the output signal from at least one of the amplifiers is stored in an analog memory.

8. The solid-state image apparatus according to claim 7, further comprising a plurality of signal lines, each connected to a corresponding one of the plurality of memories,
   wherein the result of the comparing by each of the plurality of output restriction circuits is output from the corresponding one of the plurality of memories to the corresponding signal line.

9. The solid-state image apparatus according to claim 1, wherein at least one of the plurality of output restriction circuits includes a transistor which is connected to an output terminal of a corresponding one of the plurality of amplifiers,
   wherein the transistor is turned on when the output signal from the corresponding one of the plurality of amplifiers exceeds the predetermined value.

10. The solid-state image apparatus according to claim 1, wherein the output signal from one of the plurality of amplifiers is corrected based on the result of the comparing from the corresponding one of the plurality of memories.

11. The solid state image apparatus according to claim 1, further comprising a horizontal scanning circuit, wherein the horizontal scanning circuit reads out the result of the comparing successively from the plurality of memories.

12. A solid-state image apparatus comprising:
    a pixel unit including a plurality of pixels arranged in a matrix;
    a plurality of amplifiers configured to amplify signals output from the pixels; and
    a plurality of output restriction circuits, each of the plurality of output restriction circuits provided for a corresponding one of the plurality of amplifiers and configured to perform comparing of a level of an output signal from the corresponding one of the plurality of amplifiers with a predetermined value and output a result of the comparing,
    wherein each of the plurality of output restriction circuits restricts the level of the output signal when the level of the output signal exceeds the predetermined value, and wherein at least one of the plurality of pixels includes a plurality of photoelectric converters, and outputs a first signal of one of the photoelectric converters, and a second signal obtained by adding signals including the first signal and a signal of the other of the plurality of photoelectric converters.

13. The solid-state image apparatus according to claim 12, wherein at least one of the plurality of output restriction circuits has at least two values, as the predetermined value, for respectively comparing a level of the first signal and a level of the second signal.

14. The solid-state image apparatus according to claim 13, wherein the at least two photoelectric converters are arranged below the same microlens.

15. The solid-state image apparatus according to claim 12, wherein the at least two photoelectric converters are arranged below the same microlens.

16. An image system comprising:
the solid-state image apparatus according to claim 1; and
an image signal processor configured to process an output signal from the solid-state image apparatus.

17. An image system comprising:
the solid-state image apparatus according to claim 15; and
an image signal processor configured to process an output signal from the solid-state image apparatus,
wherein the first signal and the second signal are used in focus detection.

18. An image system comprising:
the solid-state image apparatus according to claim 14; and
an image signal processor configured to process an output signal from the solid-state image apparatus,
wherein the first signal and the second signal are used in focus detection.

* * * * *